(12) United States Patent
White et al.

(10) Patent No.: US 9,013,418 B2
(45) Date of Patent: Apr. 21, 2015

(54) NAVIGATION ACCESSIBILITLY APPARATUS, METHOD AND SYSTEM

(75) Inventors: Daniel Frederick White, Flowery Branch, GA (US); Peter Robert Charpentier, Suwanee, GA (US); Jennie Psihogios Johnson, Suwanee, GA (US)

(73) Assignee: NCR Corporation, Duluth, GA (US)

(*) Notice: Subject to any disclaimer, the term of this patent is extended or adjusted under 35 U.S.C. 154(b) by 844 days.

(21) Appl. No.: 13/237,277

(22) Filed: Sep. 20, 2011

(65) Prior Publication Data

US 2013/0071817 A1  Mar. 21, 2013

(51) Int. Cl.
*G06F 3/041* (2006.01)
*G09B 21/00* (2006.01)

(52) U.S. Cl.
CPC ............ *G09B 21/004* (2013.01); *G09B 21/003* (2013.01)

(58) Field of Classification Search
CPC ... G06F 3/04865; G06F 3/0487; G06F 3/044; G06F 3/04875; G06F 3/045
USPC ..................... 345/173–179; 178/18.01–18.04
See application file for complete search history.

(56) References Cited

U.S. PATENT DOCUMENTS

| 6,154,210 | A  | * | 11/2000 | Anderson | 715/840 |
| 2006/0227115 | A1 | * | 10/2006 | Fry | 345/173 |
| 2012/0098778 | A1 | * | 4/2012 | Vu et al. | 345/173 |

* cited by examiner

*Primary Examiner* — Kimnhung Nguyen
(74) *Attorney, Agent, or Firm* — Paul W. Martin; Joseph P. Mehrle

(57) ABSTRACT

An apparatus, system and method are presented for improving the accessibility to self-service terminals by the visually impaired. An apparatus is provided that when attached to a touch-screen display improves accessibility. The apparatus includes touch identifiable symbols. A user operates a self-service terminal by selecting the appropriate symbol on the apparatus in response to audible instructions from the terminal.

11 Claims, 5 Drawing Sheets

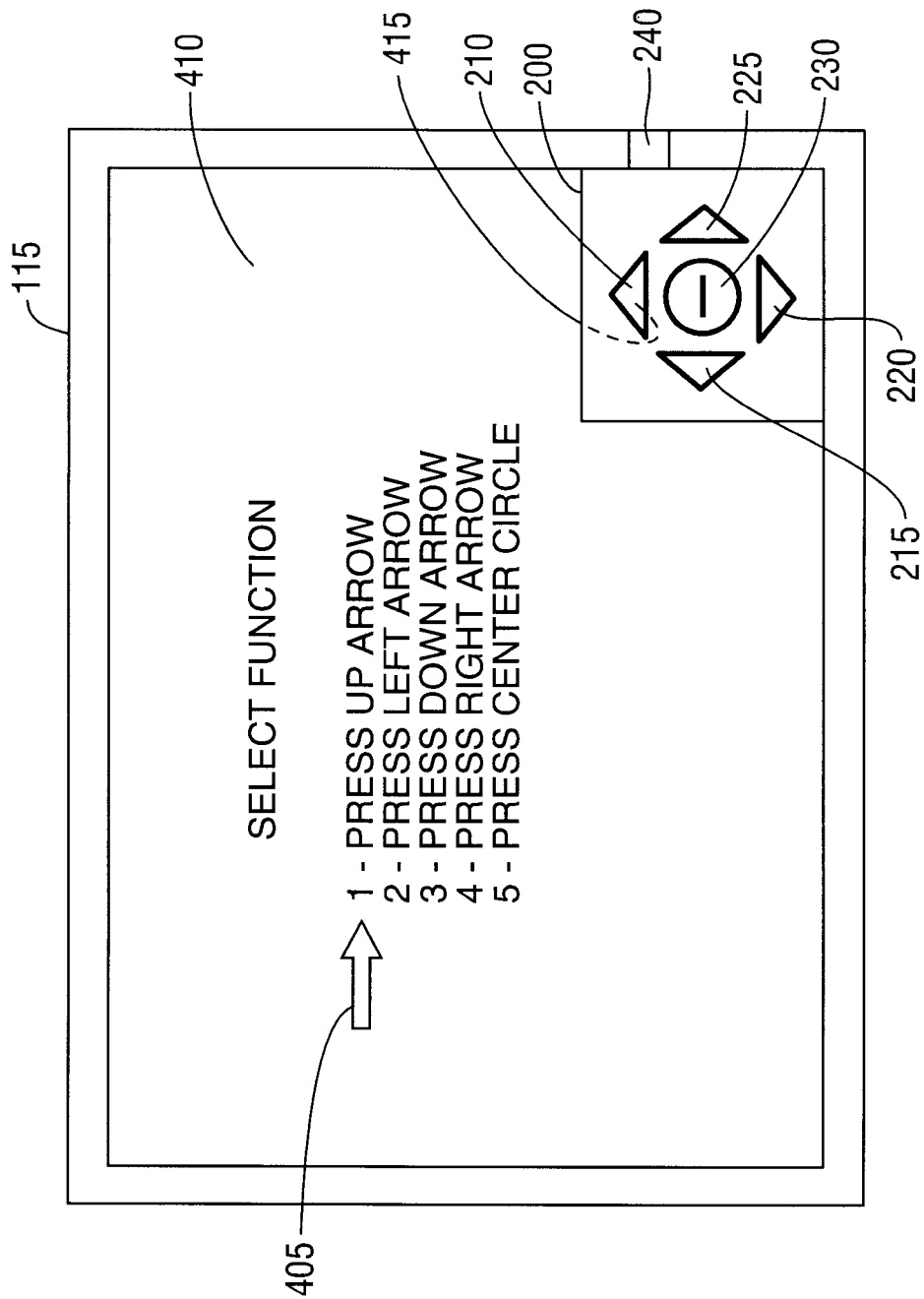

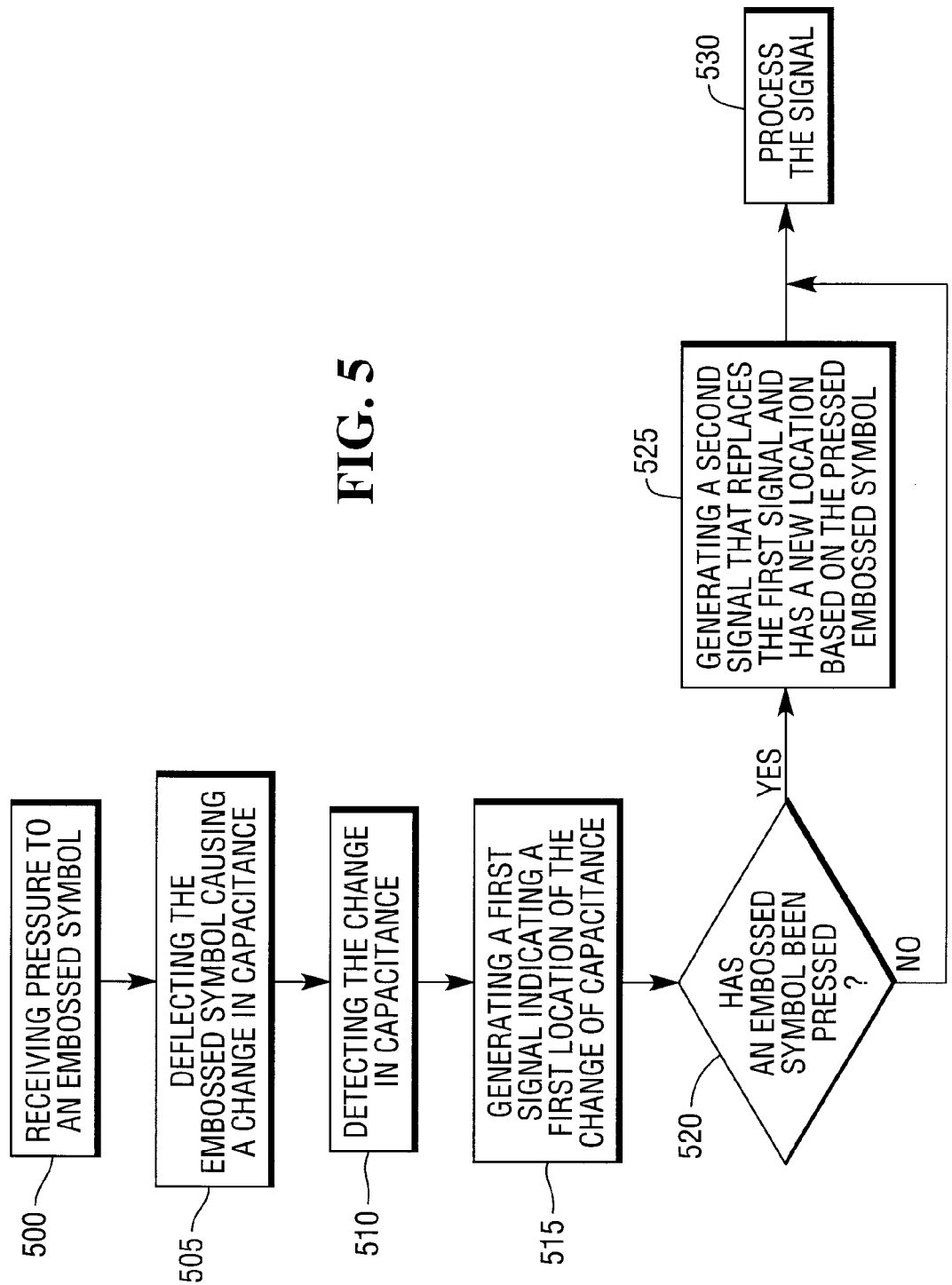

NAVIGATION ACCESSIBILITLY APPARATUS, METHOD AND SYSTEM

FIELD OF THE INVENTION

The present invention relates generally to improving accessibility to self-service terminals. More particularly, but not exclusively, the invention relates to an apparatus, method, and system for improving accessibility for the visually impaired to self-service terminals such as self-service point to sale terminals and kiosks.

BACKGROUND

Any discussion of prior art throughout the specification should in no way be considered as an admission that such prior art is widely known or forms part of common general knowledge in the field.

Self-service point of sale (SSPOS) terminals are used throughout the retail industry to process purchase transactions. Kiosk terminals are used to provide information on request and other self-service functions. In general, both types of terminals use an electronic touch-screen display to communicate with a user. A user communicates with a terminal by touching icons or locations on the display. However, people with certain disabilities, such as people with visual impairments, may find it difficult or impossible to use terminals with this type of user interface.

Therefore, there is a need for a navigation apparatus and method that allows people with certain disabilities to operate self-service terminals.

SUMMARY OF THE INVENTION

It is an object of the present invention to overcome or ameliorate at least one of the disadvantages of the prior art, or to provide a useful alternative.

Among its several aspects, one embodiment of the present invention recognizes a condition where a visually impaired person cannot operate a self-service terminal such as a point of sale terminal or kiosk because he or she cannot see and otherwise detect where to touch a touch-screen display to select a feature or function. The invention provides a tactile navigation apparatus to partially or completely eliminate the condition.

The apparatus comprises a flexible multilayer material comprising: a top graphical layer where graphics representing one or more symbols are printed and embossed on the layer where the one or more symbols are identifiable by touch; a circuit layer located below the graphical layer, the circuit layer including an electrically conductive material attached to the lower side of the circuit layer; and a spacer layer located below the circuit layer where the spacer layer has a spacer material in a first area and has no spacer material in a second area, the second area being generally underneath each of the one or more symbols.

In accordance with an embodiment of the present invention, there is provided a method of operating a self-service terminal utilizing a tactile navigation apparatus attached to a touch-screen display. The method comprises: receiving pressure to a first embossed symbol on the tactile navigation apparatus where the embossing of the first embossed symbol is identifiable by touch; deflecting the first embossed symbol reducing the distance between an electrically conductive material located under the first embossed symbol and the surface of the touch-screen display; after deflecting the electronically conductive material, causing the capacitance of a first portion of the touch-screen display proximate to the electronically conductive material to change; and detecting the change in capacitance to the first portion of the touch-screen display and generating a first signal indicating a first location on the display corresponding to the location of the first portion.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing figures and charts.

FIG. 4 is a high-level drawing illustrating an exemplar method of calibrating a tactile navigation apparatus attached to a touch-screen display.

FIG. 5 is a high-level flow chart depicting an exemplary method for operating the tactile navigation apparatus.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The claimed invention is described in combination with a self-service point of sale terminal 105. However, other embodiments are envisioned where the invention is used in combination with a kiosk or other self-service terminal.

Figure 1:
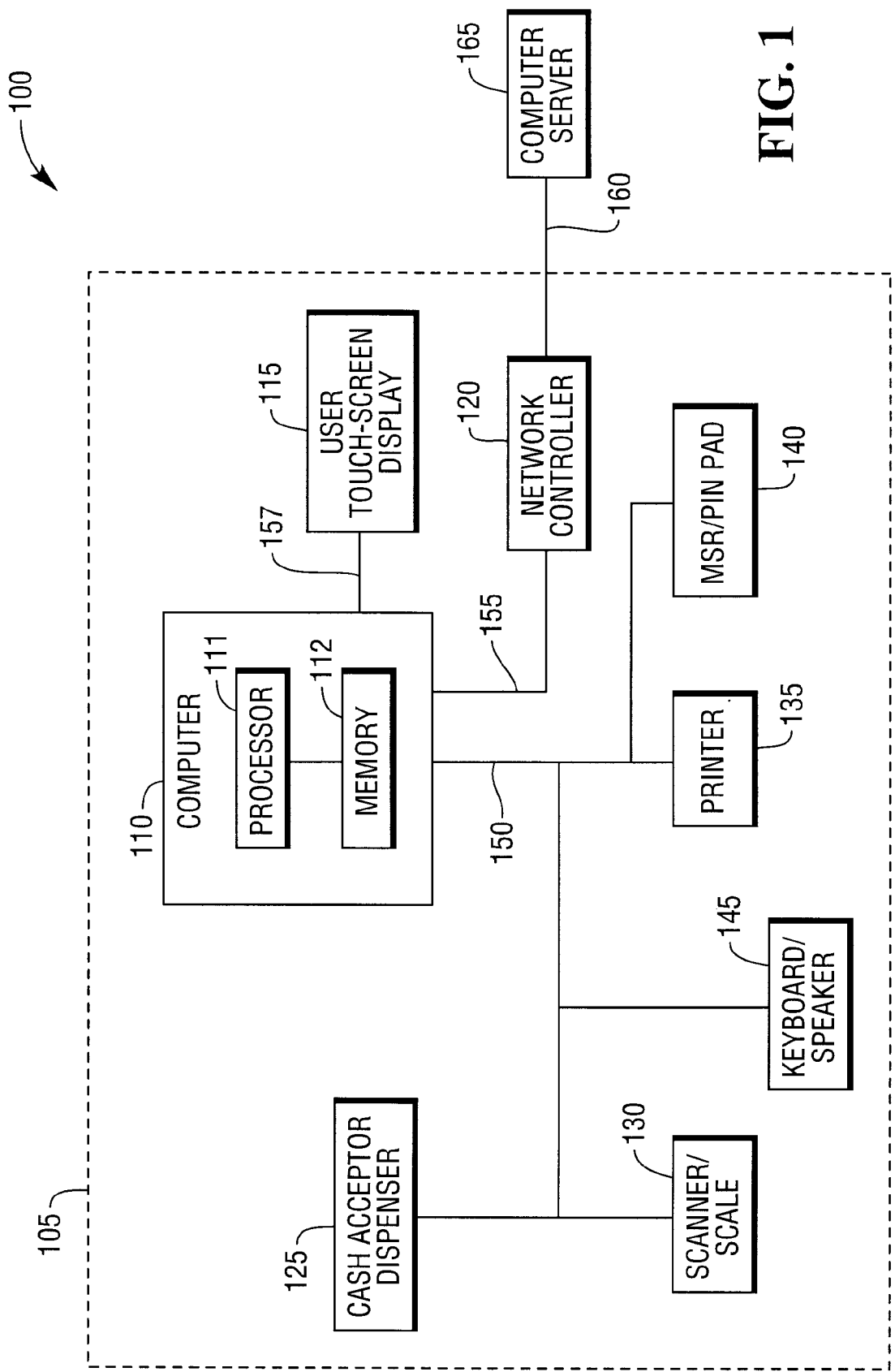
FIG. 1 is a high-level block diagram illustrating an exemplar embodiment of a self-service point of sale system.

With reference to FIG. 1, there is provided a high-level block diagram illustrating an exemplar embodiment of a self-service point of sale system 100. The system 100 includes one or more self-service point of sale terminals (SSPOS) 105 connected over a data network 160 to a computer server 165. The computer server 165 is a computer that provides resources and functions that are used by the one or more of the SSPOS terminals 105. The resources and functions include a price lookup database and connections to one or more networks used to communicate with other computers (both local and remote) to perform additional functions, such as payment transactions using credit or debit card information.

The one or more SSPOS terminals 105 connect to the server 165 over the network 160 to send and receive data. In some embodiments, the network 160 uses physical cables to connect each SSPOS terminal 105 to the server 165 and in other embodiments, a wireless interface (not shown) is used to connect each SSPOS terminal 105 to the server 165. Still other embodiments use a combination of physical and wireless connections.

The SSPOS terminal 105 performs a number of functions including processing a purchase transaction. A purchase transaction begins when one or more items are presented to the SSPOS terminal 105 for identification. As each item is identified, a price is determined. In some embodiments, the terminal 105 retrieves the price for an item from the price lookup database on the server 165. Some items are sold by weight so the item's weight must be determined before a price can be determined. The SSPOS terminal 105 maintains information on all items presented including a total price for all items. The SSPOS terminal 105 processes a payment for the items once all items have been presented and a total price determined. The purchase transaction ends when payment for the presented items has been received or processed.

In the present embodiment, the SSPOS terminal 105 includes a computer 110 that communicates with and controls a cash acceptor/dispenser 125, a user touch-screen display 115, a keyboard/speaker 145, a network controller 120, a printer 135, an MSR/PIN pad 140, and a scanner and scale combination (scanner) 130. The computer 110 includes a processor 111, memory 112 and interface circuitry (not shown). The memory 112 includes both short and long term memory. Software is stored in the memory 112 and when it is executed by the processor 111, it causes the processor 111 to communicate with and control all the devices of the terminal 105. It also causes the processor 111 to create all the features and functions of the terminal 105 including the user interface.

The processor 111 communicates with the other devices of the SSPOS terminal 105 over a plurality of computer data buses 150, 155, 157. In one embodiment, the peripheral bus 150 is a an industry standard USB bus, the network controller 120 is connected to the computer 110 using a standard PC bus 155, and the user touch-screen display 115 uses an industry standard video bus 157 such as HDMI and a separate bus for receiving touch screen data.

In some embodiments, the SSPOS terminal 105 uses the speaker 145 to communicate with a user. The software stored in the memory 112 generates sounds including words using the speaker 145. The generated sounds are used to communicate information or instructions to a user.

Figure 2A:
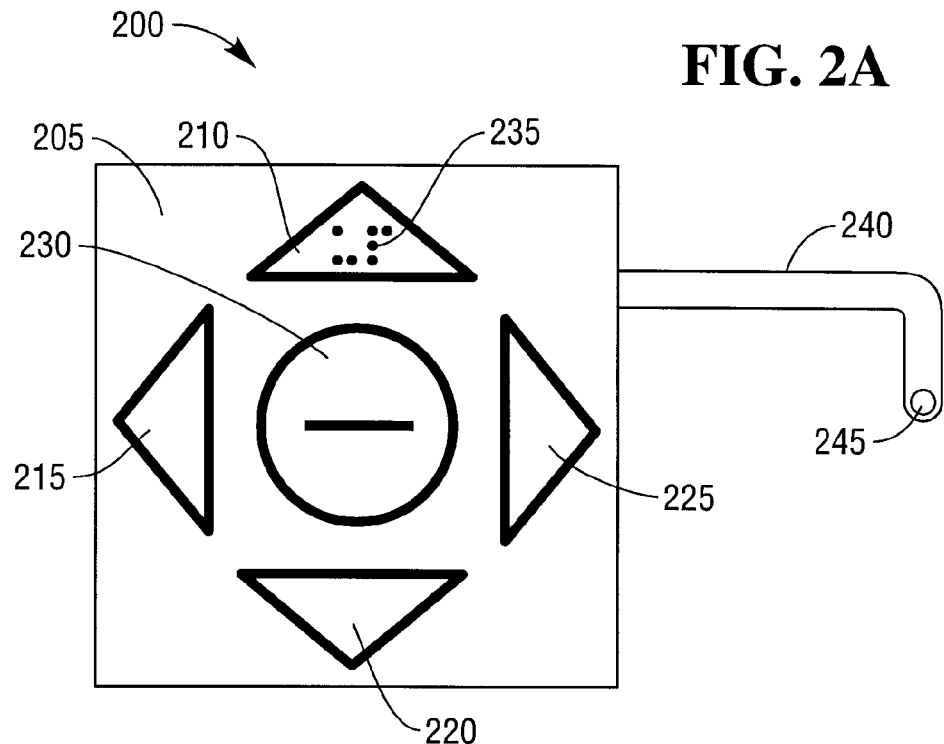
FIG. 2 is a high-level drawing illustrating an exemplar embodiment of a tactile navigation apparatus.

Referring to FIG. 2A, there is provided a drawing illustrating an exemplar embodiment of a tactile navigation apparatus 200. The apparatus 200 is comprised of a flexible multilayer composite material 205. In this embodiment, Five symbols 210, 215, 220, 225, 230 are incorporated into the material 205. Other embodiments can have more or less symbols and different symbols. Each of the symbols have raised or embossed features that uniquely distinguish each symbol by touch. The raised or embossed features also have a different color from the surrounding area so they are also visually distinguishable. Symbol 210 depicts an up arrow and symbol 215 depicts a left pointing arrow. Symbol 220 depicts a downward pointing arrow and symbol 225 depicts a right pointing arrow. Symbol 230 depicts a circle. In some embodiments, each symbol includes Braille text 235 that describes the symbol. For example, the up arrow symbol 210 includes Braille text 235 for the word "up".

Each of the symbols 210, 215, 220, 225, 230 have a corresponding function that relates to activity displayed (such as highlighting an item) on the touch-screen display 115. The four directional symbols 210, 215, 220, 225 are used to move the focus or highlight from one item or location to another on the display 115.

For example, if a number of items are presented vertically on the display 115 and the first item (top most) is highlighted, pressing the down arrow symbol 220 causes the first item to lose highlighting and the next item below it to be highlighted. Pressing the circle symbol 230 causes the highlighted item to be selected. Pressing any of the symbols causes a response on the display 115 that mimics an actual touch to the display 115.

In another example, pressing the circle symbol 230 causes the highlighted item to be selected just as pressing the highlighted item would have caused it to be selected.

Before and during the operation of the apparatus 200, the terminal 105 gives audio instructions to the user of the terminal 105, such as reading the text for a highlighted item so the user can determine if this is the item they wish to select. If not they can use one of the arrow symbols to move the highlight to another item which is then read to the user by the terminal 105. The terminal 105 can also give instructions on how to use the apparatus 200.

Figure 2B:
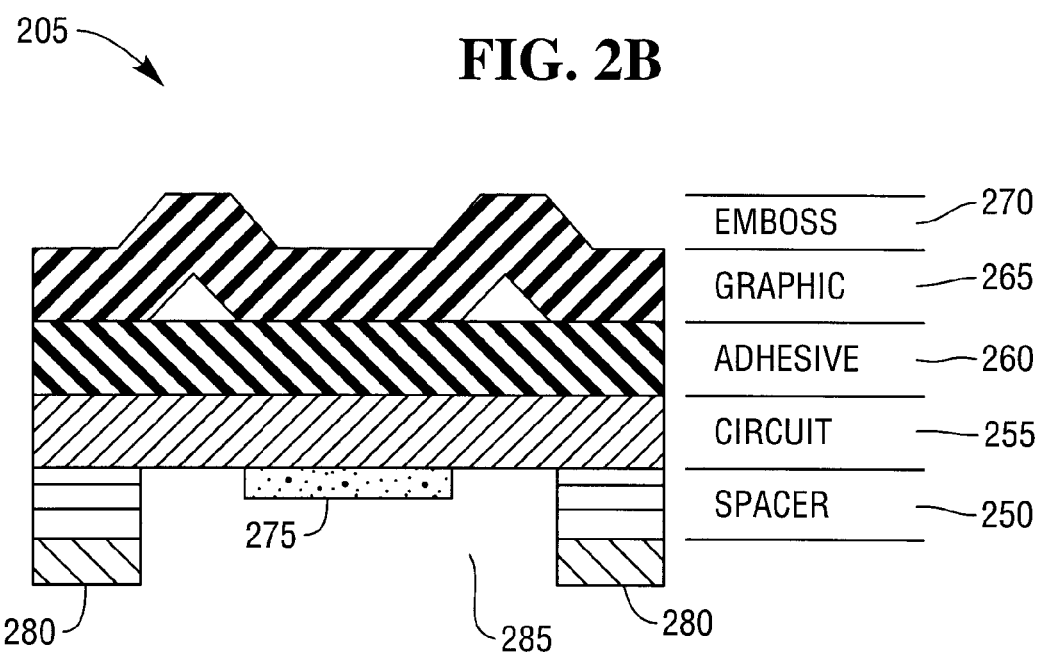

The multilayer composite material includes a circuit layer 255 (FIG. 2B). The circuit layer 255 extents beyond the main body 205 of the apparatus 200 to form a pigtail lead 240. The pigtail lead 240 is connected at a location 245 to an electrical ground of the touch-screen display 115.

FIG. 2B provides a drawing illustrating layers of the multilayer composite material 205. A graphic layer 265 includes printed and embossed information for one or more symbols. When a portion of the graphic layer 265 is embossed, the embossed portion extents into the embossed layer 270 and becomes distinguishable by touch. The graphic layer 265 is attached to the circuit layer 255 by an adhesive layer 260. The bottom of the circuit layer 255 includes electrically conductive material that forms an electrically conductive area 275 under each symbol. Each electrically conductive area is grounded to the electrical ground of the touch-screen display 115 at the location 245 (FIG. 2A) using the pigtail lead 240. A spacer layer 250 provides support to the circuit layer 255 and also provides an open cavity or space 285 around and below each electrically conductive area 275.

When pressure is applied to an area of the graphic layer 265 over the electrically conductive area 275, the electrically conductive area 275 is deflected toward the bottom of the spacer layer 250. When the pressure is removed, the graphic layer 265 and electrically conductive area 275 return to their original position. The movement of the layers provides a tactile feedback to the person applying the pressure. Only areas representing the one or more symbols have a cavity under the circuit layer 255 and display movement when pressed.

In some embodiments, the movement of the layers when pressure is applied to the graphic layer 265 is not sufficient to provide tactile feedback to the user. The terminal 105 generates one or more audible sounds to provide feedback. In some embodiments, the audible sounds are provided whether or not the tactile feedback is present in the apparatus 200. In addition, the audible sounds include words that describe the symbol being pressed. For example, pressing the up symbol 210 causes the terminal 105 to generate an audible sound for the word "UP". The terminal 105 may also support different languages and the sound would be generated in a selected language.

In addition, when the apparatus 200 is attached to the touch-screen display 115, pressing one of the one or more symbols causes the electrically conductive area 275 to move toward the surface of the display 115 causing a change in the capacitance at the touch surface of the display 115 which the display 115 detects. When the touch-screen display 115 detects a change in capacitance, it generates a signal that includes the location on the screen where the capacitance changed. This signal is transmitted to the computer 110 for processing by the software.

In some embodiments, an adhesive material 280 is applied to the bottom side of the spacer layer 250 so the apparatus 200 will adhere to a surface such as the user touch-screen display 115. In other embodiments, the material used in the spacer layer 250 is selected to create an electrostatic adhesion to a surface such as the user display/touch screen 115. Both the adhesive material 280 and electrostatic adhesion are sufficient to hold the apparatus 200 in a fixed location on the user touch-screen display 115. The adhesive material 280 provides a permanent attachment while the electrostatic adhesion allows the apparatus 200 to be removed or moved to a different location on the user touch-screen display 115. A backer sheet (not shown) is applied to the outer surface of the adhesive material 280 to protect the adhesive material 280 prior to the apparatus 200 being attached to the display 115. The backer sheet is removed prior to the apparatus 200 being attached to the display 115.

Figure 3:
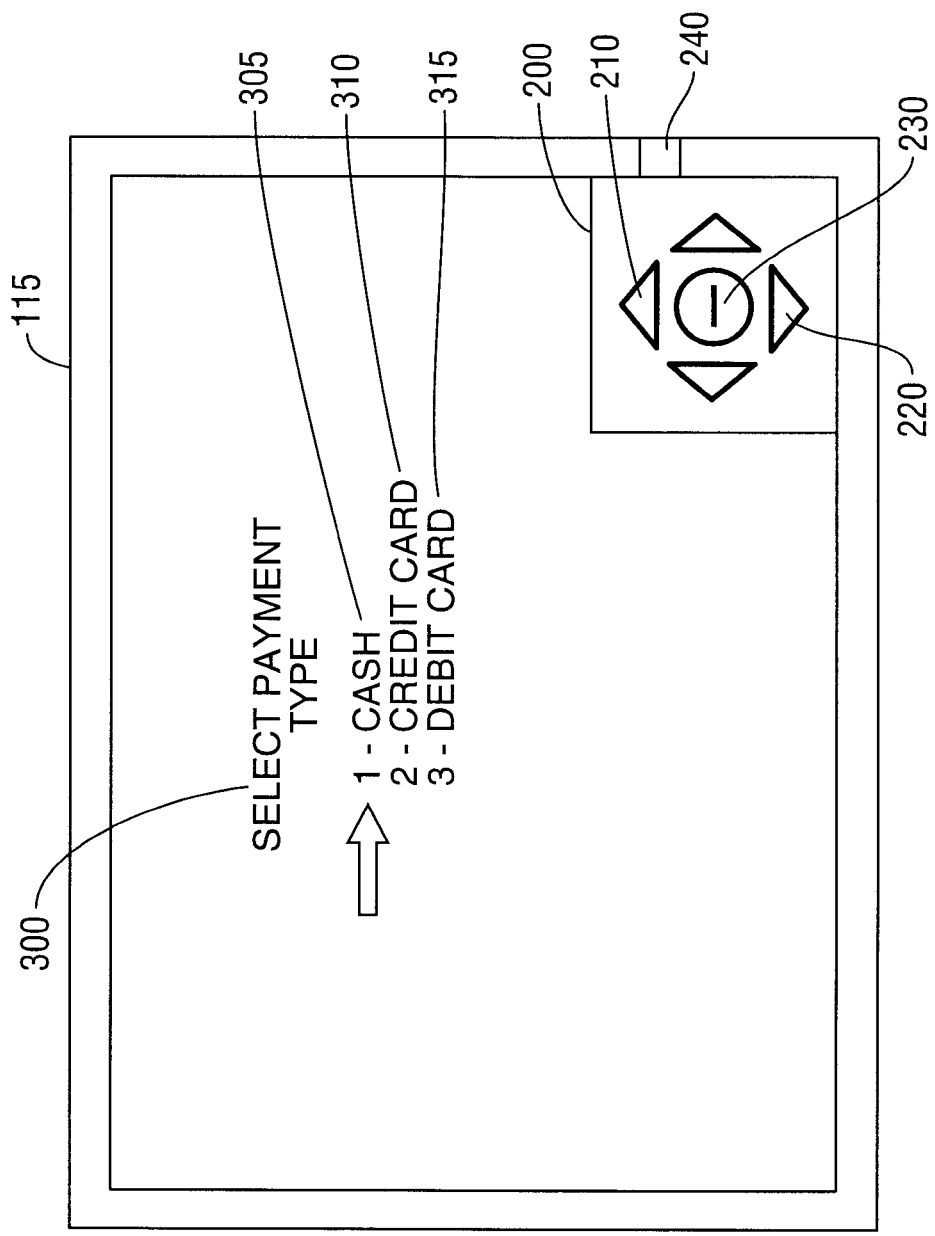
FIG. 3 is a high-level drawing illustrating an exemplar embodiment of a tactile navigation apparatus attached to a touch-screen display.

Turning to FIG. 3, there is provided an illustration of the user touch-screen display 115 with the tactile navigation apparatus 200 attached. In this embodiment, the apparatus 200 is attached in the lower right corner of the user touch-screen display 115. In other embodiments, the apparatus 200 can be attached in other locations on the display 115.

This illustration depicts an example where the apparatus 200 is used to select a payment type for a purchase transaction conducted on the terminal 105. Normally, the terminal 105 would instruct a user, both verbally and by text on the screen, to select one of the three payment options 305, 310, 315 by touching the option. The terminal 105 would then detect the touch and select the proper payment option. However, a visually impaired people may not be able to see the options on the screen. In this case, the user would move their finger across the screen until the apparatus 200 is detected. They would then press either the up 210 or down 220 symbol. The terminal 105 detects which symbol is pressed and verbally reads either the top or bottom payment option, depending on whether the down 220 or up 210 symbol was pressed. Pressing either symbol a second time will cause the middle payment option to be selected and verbally read to the user. When the user hears the desired payment option, he or she presses the circle symbol 230 which selects the payment option last read.

FIG. 3 illustrates one embodiment of a user interface that allows a visually impaired person to operate the terminal 105 using the apparatus 200. Any feature or function that is based on a user selecting options can take advantage of the apparatus 200.

The apparatus 200 can be installed on a display/touch screen 115 during the manufacturing process or the apparatus 200 can be installed on the touch-screen display 115 of a terminal 105 that has been installed and operating at a customer site for some time. Driver software for the apparatus 200 is also installed on the terminal 105.

Turning to FIG. 4, there is provided an illustration of a method implemented by the software being executed by the processor 111 that calibrates the apparatus 200 after it is applied to the touch-screen display 115. The apparatus 200 is typically attached to the touch-screen display 115 in the same location. However, the exact location may vary from one display 115 to another. Because of the variations, the apparatus 200 can be calibrated after it is attached to assure proper operation by determining the exact location of the symbols on the apparatus 200. The calibration can be run initially after installation of the apparatus 200 but can also be run at other times in the future to compensate for changes over time to the materials or components used in the apparatus 200 and the touch-screen display 115.

The calibration software displays five options on the touch-screen display 115 and places an arrow 405 next to the first option labeled "PRESS UP ARROW." The operator then presses the up arrow symbol 210 on the apparatus 200. The touch-screen display 115 detects the change in capacitance in the area under the up arrow symbol 210 and generates a signal that includes a location 415 on the touch surface 410 of the touch-screen display 115 where the capacitance has changed as a result of pressing the up arrow symbol 210. The calibration software then associates the location 415 with the up arrow symbol 410. The calibration software then moves the arrow 405 to the next option displayed on the touch-screen display 115 and repeats the process until a location on the touch surface 410 has been associated with each of the symbols 210, 215, 220, 225, 230 on the apparatus 200.

In some embodiments, software maintains a symbol location table in memory 112 that includes a touch surface 410 location for each of the symbols 210, 215, 220, 225, 230 of the apparatus 200. The calibration software updates the symbol location table to the current location of each symbol. The symbol location table is used by the software to determine when one of the symbols is pressed.

Referring to FIG. 5, there is provided a high-level flow diagram illustration an exemplar method of operating the apparatus 200. In step 500, the apparatus 200 receives pressure applied by a user to an embossed symbol on the apparatus 200. The embossing of the embossed symbol makes the symbol identifiable to the user by touch. In some embodiments, the embossing includes Braille text that identifies the symbol. In step 505, the pressure applied to the embossed symbol causes an area, including the symbol, to deflect reducing the distance between electrically conductive material 275 located under the circuit layer 255 of the embossed symbol and the touch surface 410 of the touch-screen display 115. In step 510, the touch-screen display 115 detects the capacitance change at a first location on the touch surface 410. In step 515, the touch-screen display 115 generates a first signal that includes the first location and sends the first signal to the computer 110.

In step 520, the software executed by computer 110 processes the first signal and determines that one of the embossed symbols of the apparatus 200 has been pressed. In some embodiments, the location in the first signal is compared to symbol locations in the symbol location table to determine which symbol has been pressed. If a symbol is pressed, control passes to step 525 otherwise, control passes to step 530.

In step 525, the software generates a second signal that has a new location. The software also deletes the first signal and replaces it with the second signal. The new location is determined by function of the pressed symbol and the current activity on the display 115. For example, if the up arrow symbol 210 is pressed, the software will determine a location for the current highlighted item on the display 115 and then determine a location for an item above the highlighted item. The software will then place the location for the item above the highlighted item in the second signal. The second signal then replaces the first signal and is processed normally in step 530. Normal processing means that software that normally responds to screen touches will process the second signal and operate is if the item above the highlighted item was actually touched by the user.

In another example, the select symbol 230 is pressed. The software will determine the location of the current highlighted item on the display 115 and place that location in the second signal. When the second signal is processed in step 530, it will appear that the highlighted item was touched by the user.

In step 530, the software processes either the first signal or the replacement second signal.

Replacing the location in the signal when a symbol is pressed, allows the apparatus 200 work with existing software that has not been designed to work with the apparatus 200. Only the driver software for the apparatus 200 has to be installed.

In other embodiments, the software in step 525 generates a second signal that corresponds to a keyboard input signal. The apparatus 200 is treated as a keyboard and the symbols on the apparatus 200 are treated as keys that are pressed. Once the software processes the first signal to determine which signal has been pressed, it generates a second signal that represents the pressed symbol. For example, if the up arrow 210 symbol is pressed, the software would return a second signal that represents the up arrow key (in ACSII decimal 24).

Although particular reference has been made to an embodiment that includes a self-service point of sale terminal and examples have been provided illustrating the invention in combination with the self-service point of sale terminal, certain other embodiments, variations and modifications are also envisioned within the spirit and scope of the following claims. For example, there are embodiments where the invention is used in combination with a kiosk. In addition, many other types of self-service terminal are envisioned.

We claim:

1. A tactile navigation apparatus for use on a touch-screen display, the apparatus comprising:
    a flexible multilayer material comprising:
        a top graphical layer where graphics representing one or more symbols are printed and embossed on the layer and where the one or more symbols are identifiable by touch;
        a circuit layer located below the graphical layer, the circuit layer including an electrically conductive material attached to the lower side of the circuit layer; and
        a spacer layer located below the circuit layer where the spacer layer has a spacer material in a first area and has no spacer material in a second area, the second area being generally underneath each of the one or more symbols and wherein the electrically conductive material under one of the one or more symbols is deflectable down through an opening in the spacer layer when a force is applied on the graphical layer above the one of the one or more symbols, and wherein the deflectable electrically conductive material, when deflected, locally changes the capacitance of the touch-screen display.

2. The apparatus of claim 1, further including an adhesive layer located below the spacer layer and having the same pattern as the spacer layer, the adhesive layer including a backer sheet overlying the lower side of the adhesive layer where the backer sheet is removed prior to attaching the apparatus.

3. The apparatus of claim 1, where a portion of the circuit layer extends beyond the spacer layer creating a pigtail lead that attaches the electrically conductive material to an electrical ground of the touch-screen display.

4. The apparatus of claim 1, where the embossed symbols includes Braille text identifying the symbols.

5. The apparatus of claim 1, where the one or more symbols include symbols that represent a direction of movement and a select symbol.

6. A method of operating a self-service terminal utilizing a tactile navigation apparatus attached to a touch-screen display, the method comprising:
    receiving pressure to a first embossed symbol on the tactile navigation apparatus where the embossing of the first embossed symbol is identifiable by touch;
    deflecting the first embossed symbol reducing the distance between an electrically conductive material located under the first embossed symbol and the surface of the touch-screen display;
    after deflecting the electronically conductive material, causing the capacitance of a first portion of the touch-screen display proximate to the electronically conductive material to change;
    detecting the change in capacitance to the first portion of the touch-screen display and generating a first signal indicating a first location on the display corresponding to the location of the first portion;
    receiving the generated first signal and determining, using the first location, that the first embossed symbol was pressed; and
    generating, after the determining step, generating a second signal that replaces the first signal where the second signal indicates a second location on the display where the second location is determined by a function assigned to the first embossed symbol and a current activity on the display.

7. The method of claim 6, wherein the function assigned to the first embossed symbol is a select highlighted item function.

8. The method of claim 6, wherein the function assigned to the first embossed symbol is a move to another highlighted item function.

9. The method of claim 6, further comprising:
    instructing a user to press the first embossed symbol; and
    receiving the generated signal and associating the location on the display with the location of the first embossed symbol.

10. The method of claim 9, further comprising notifying the user that the association was successful so the user will stop pressing the symbol.

11. A method of operating a self-service terminal utilizing a tactile navigation apparatus attached to a touch-screen display, the method comprising:
    receiving pressure to a first embossed symbol on the tactile navigation apparatus where the embossing of the first embossed symbol is identifiable by touch;
    deflecting the first embossed symbol reducing the distance between an electrically conductive material located under the first embossed symbol and the surface of the touch-screen display;
    after deflecting the electronically conductive material, causing the capacitance of a first portion of the touch-screen display proximate to the electronically conductive material to change;
    detecting the change in capacitance to the first portion of the touch-screen display and generating a first signal indicating a first location on the display corresponding to the location of the first portion;
    receiving the generated first signal and determining, using the first location, that the first embossed symbol was pressed; and
    after the determining step, generating a second signal that replaces the first signal where the second signal indicates a keyboard input that corresponds to the first embossed symbol.

* * * * *